D. O. DE WOLF.
Harvester.
No. 20,411.
Patented June 1, 1858.
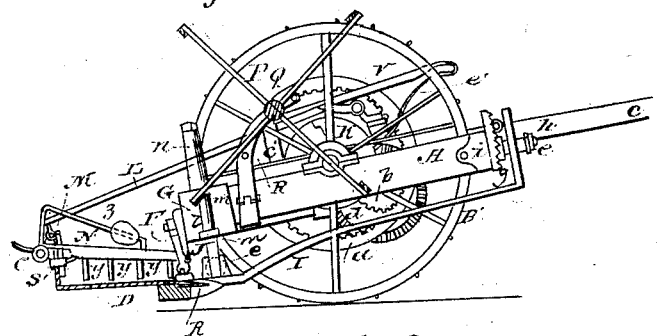
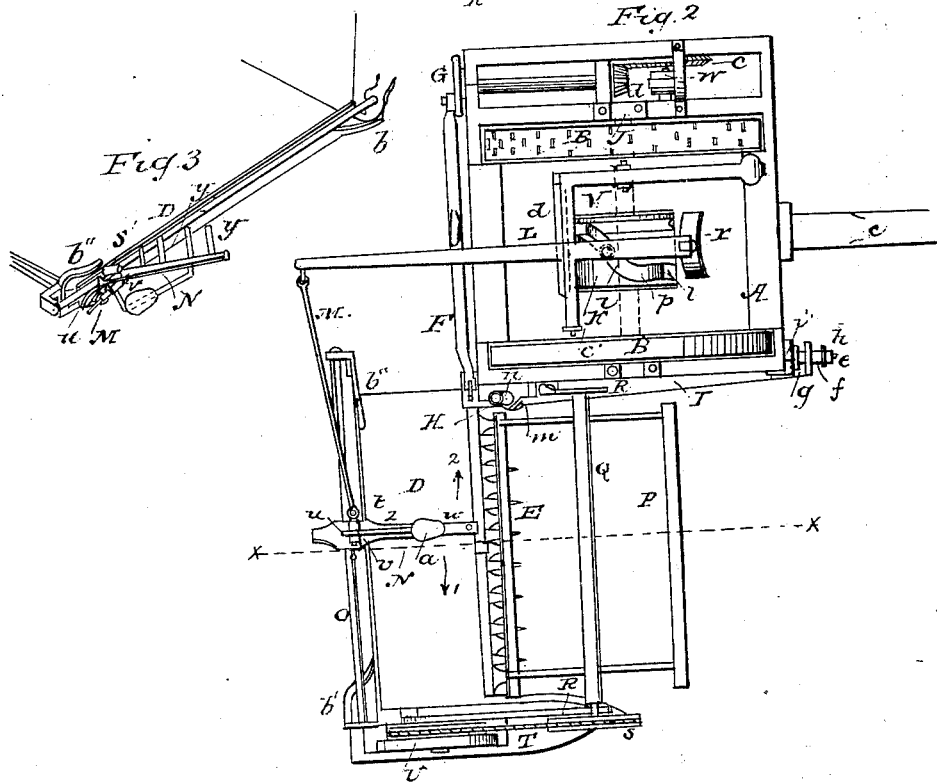

UNITED STATES PATENT OFFICE.

D. O. DE WOLF, OF BROWNVILLE, NEW YORK.

IMPROVEMENT IN RAKING ATTACHMENTS TO HARVESTERS.

Specification forming part of Letters Patent No. 20,411, dated June 1, 1858.

*To all whom it may concern:*

Be it known that I, D. O. DE WOLF, of Brownville, in the county of Jefferson and State of New York, have invented a new and Improved Raking Attachment for Harvesters; and I do hereby declare that the following is a full, clear, and exact description of the same, reference being had to the annexed drawings, making a part of this specification, in which—

Figure 1 is a side sectional elevation of a harvester with my improvement applied to it. $x\ x$, Fig. 2, shows the plane of section. Fig. 2 is a plan or top view of the same. Fig. 3 is a detached perspective view of a portion of the improvement.

Similar letters of reference indicate corresponding parts in the several figures.

To enable those skilled in the art to fully understand and construct my invention, I will proceed to describe it.

A represents the main frame of a harvester, which is mounted on two wheels, B B′, and has a draft-pole, C, attached to its front end.

D is the platform, having a reciprocating sickle, E, at its front end. This sickle E is operated by a connecting-rod, F, from a crank-pulley, G, which receives its motion from the driving-wheel B′ by means of gearing $a\ b\ c\ d$. (See Figs. 1 and 2.)

The front part of the platform D is attached to a finger-bar, H, on which the sickle E works. The inner end of this finger-bar is permanently connected to a metal bar or strap, I, the front end of which is bent upward in a vertical position, and is secured to the front end of the frame A by means of a bolt, $e$, which passes through an arbor, $f$, having a circular serrated disk, $g$, at its inner end, which disk, by screwing up the nut $h$ on the bolt $e$, is made to engage firmly with a rack, $i$, at the front end of the frame A. By this mode of connection the bar or strap I may be attached to the main frame A at a higher or lower point, as desired, and the front end of the bar or strap is allowed to turn freely on the arbor $f$. The back end of the bar or strap I has a socket, $j$, formed on it, and this socket receives a ball, $k$, which is at the lower end of a rod, $l$, said rod being fitted in guides $m$, attached to the main frame. The rod $l$ is allowed to work a certain distance freely up and down in the guides $m$, the length of its movement being controlled by a tube, $n$, which is fitted on the rod above its uppermost guide, $m$, the upper end of the rod $l$ having a nut, $o$, fitted on it. The bar or strap I extends the whole length of the main frame A, and consequently the sickle E is about in line with the back end of the main frame, the connecting-rod F being behind the main frame.

The axle J of the wheels B B′ is placed about the center of the main frame A, and the driving-wheel B′ is attached permanently to the axle, the wheel B being placed loosely on it. On the axle J, at about its center, a cam, K, is placed. This cam is formed of a metal cylinder provided circumferentially with a serpentine or zigzag groove, $p$, which in one revolution passes once from one edge of the cylinder to the other. This groove $p$ has not a constant or gradual spiral curve. One part (designated by 1) has a much more abrupt or quick curve than the other part, 2. Around the cylinder, near one edge, a groove, $q$, is formed, said groove being in a vertical plane or parallel with the edges of the cylinder.

L is a lever, the front end of which is attached by a universal joint, $r$, to the main frame A or the platform thereon. This lever extends some distance beyond the back end of the main frame, and has a rod, M, attached to it. To the under side of the lever L a pin is attached having a friction-roller, $s$, upon it, and this friction-roller, when the raking device is in operation, fits within the serpentine groove $p$. The rod M is connected by a hook and eye, $t$, to a bolt, $u$, which is fitted loosely in a socket, $v$, attached to one end of a rake, N. This rake is formed of a rod, $w$, provided with teeth $y$, and the rod $w$, near its point of connection with the rod M, is fitted and allowed to slide freely on a guide-bar, O, which is attached to the back end of the platform D, extends its whole length, and is parallel with it.

To the outer or upper surface of the rod $w$ a rod, $z$, is attached. This rod has a weight, $a'$, fitted loosely on it, and the rod $z$ is not parallel with the rod $w$, but has an inclined position, its inner end being lower than its outer end, as shown clearly in Fig. 1. The rod $w$ extends a short distance beyond the guide-bar O, and to the ends of the platform D bars $b'$ $b''$ are attached—one at each end—the bar $b'$ having an oblique position and the bar $b''$ an inclined position. (See Figs. 2 and 3.)

P represents the reel, the shaft Q of which has its bearings in bars R R, which are attached to the machine. The outer end of the shaft Q has a pulley, S, attached, around which a belt, T, passes, said belt also passing around the wheel U at the outer end of the platform.

V is a bent lever, one end of which is attached to or fitted in an upright, $c'$, which is secured to the platform of the main frame A. This lever has a bar or hook, $d'$, attached to its under side, on or over which the lever L works. The front end of lever V is kept in an elevated state by a spring, $e'$, when not otherwise acted upon.

W is a clutch by which the wheel $c$ may be thrown in and out of gear with the pinion $d$, and the sickle, when necessary, disconnected from the driving-wheel. To the rod $w$ of the rake, and near the guide-bar O, a friction-roller, $s'$, is attached.

The operation is as follows: As the machine is drawn along the rake N is moved back and forth on the guide-bar O by means of the lever L, operated by the cam K, and when the rake passes from the inner toward the outer end of the platform, as indicated by the arrow 1, the movement of the rake will be comparatively slow, as the friction-roller $s$ of lever L will be in the gradual curved part 2 of the groove $p$ of the cam, and when the rake moves in the opposite direction—viz., from the outer to the inner end of the platform, as indicated by arrow 2—its movement will be comparatively quick, as the lever L is then operated by the quick or abrupt portion 1 of the groove $p$. When the rake is moving in the direction of arrow 1, it is thrown over free from the platform, the weight $a'$ retaining it in that position, and as the rake completes its outward stroke or movement the outer end of its rod $w$ strikes the oblique bar $b'$, and the rake N will be thrown over on the platform D, the weight $a$, sliding down to the forward end of the rod $z$, holding the rake down firmly to the platform, and, as it completes its quick inward stroke or movement, raking the grain from off the end of the platform and dropping it on the ground in rear of the main frame A, and in the same relative position as it lay on the platform and out of the way of the machine on its return swarth. The friction-roller $s$ will strike the inclined bar $b''$, and the front end of the rake N will be elevated so as to allow the sliding weight $a$ on the rod $z$ to slide down from the front end of the rod to its outer or rear end, back of the guide-rod O, which change of position of the sliding weight completes the throw of the rake over back from the platform, and retains it there as before, and again commences its comparatively slow outward movement, so that a sufficient quantity of grain may be cut to form a proper-sized gavel by the time its quick inward or raking-off movement commences.

The movement of the lever L may be stopped at any time by the driver, who places his foot on the lever V, and thereby raises the pin $s$ out of the groove $p$ and places it in the groove $q$, which stops the movement of the rake, this groove being in a vertical line or parallel with the edge of the cylinder. The finger-bar and platform, being connected to the main frame A by the joint $j$ forward of the sickle E, removes all obstruction to the rake's freely traveling across the whole length of the platform D and dropping the gavel, as before described, in good condition for binding without liability to become tangled, as is the case when the rake is given a circular motion at the last part of its raking-off movement, as in the patent granted to S. T. Lamb April 29, 1856. If this joint were placed in rear of the sickle, as in the case of Ball and Aultman's machine and others, this straight forward movement could not be obtained. The joint would interfere with the rake, and the connections between the finger-bar or platform would interfere with the delivery of the grain from the platform to the ground, so that with these connections in rear of the sickle it becomes absolutely necessary to give the rake a circular motion at the inner end of the platform, whereby the grain is unavoidably tangled and in bad condition for binding. This manner of connecting the finger-bar or platform to the main frame forward of the sickle is facilitated by the position of the wheel U, balancing the platform or supporting it at opposite corners, and the raking off without scattering is accomplished by the peculiar form of that portion of the groove $p$ in the cam K marked 2, which gives the rake a constantly-increasing velocity until it completes its raking-off movement, dropping the gavel on the ground perfectly straight and in perfect condition for binding.

I do not broadly claim imparting a circular or longitudinal motion to a rake by means of a cam irrespective of the form of the cam; nor do I broadly claim elevating or depressing a rake by means of cams either attached to the rake or separate from the rake, irrespective of the devices employed by me, as fully shown and described herein; but Having described my invention, what I claim, and desire to secure by Letters Patent, is—

1. The employment of a cam, K, of the form hereinbefore described, in combination with the devices employed for operating or stopping the motion of the rake at the will of the driver for the purpose of imparting a variable reciprocating motion to the rake N during the entire length of the platform D in a line at right angles to the course of the machine, as specified.

2. Elevating and depressing the rake in the manner and by the devices hereinbefore shown, and for the purposes described.

3. The rake, as described, with the inclined rod $z$ and the weight $a$, combined and operating together, as herein described, and for the purposes as set forth.

D. O. DE WOLF.

Witnesses:
N. B. LORD,
CHAS. F. PEARSON.